US012710966B2

(12) United States Patent
Ross et al.

(10) Patent No.: US 12,710,966 B2
(45) Date of Patent: Aug. 18, 2026

(54) CONTROLLING INTERACTION WITH SCALABLE APPLICATIONS USING METADATA-DRIVEN SHARED CONFIGURATION

(71) Applicant: International Business Machines Corporation, Armonk, NY (US)

(72) Inventors: Martin A. Ross, Gosport (GB); Luke James Powlett, Romsey (GB); Jack Richard William Stevenson, Winchester (GB); Jack William Donato Evans, Rochester (GB)

(73) Assignee: International Business Machines Corporation, Armonk, NY (US)

( * ) Notice: Subject to any disclaimer, the term of this patent is extended or adjusted under 35 U.S.C. 154(b) by 611 days.

(21) Appl. No.: 17/663,042

(22) Filed: May 12, 2022

(65) Prior Publication Data

US 2023/0367608 A1 Nov. 16, 2023

(51) Int. Cl.
*G06F 9/445* (2018.01)

(52) U.S. Cl.
CPC ................................ *G06F 9/44505* (2013.01)

(58) Field of Classification Search
CPC ................................ G06F 9/44505
USPC ................................ 718/100
See application file for complete search history.

(56) References Cited

U.S. PATENT DOCUMENTS 8,707,254 B2 * 4/2014 Oslake .................. G06F 8/30
717/111
9,712,411 B2 * 7/2017 Tseitlin ................ H04L 67/10
9,971,823 B2 5/2018 Vasanth
11,030,169 B1 6/2021 Wu
11,032,160 B1 * 6/2021 Raheja ................ H04L 41/0843
2003/0093528 A1 * 5/2003 Rolia .................. G06F 9/5061
709/224
2012/0102369 A1 * 4/2012 Hiltunen .............. G06F 11/008
714/48
2012/0215779 A1 * 8/2012 Lipstone ........... G06F 16/24556
707/E17.089
2013/0225122 A1 * 8/2013 Kahn .................. H04M 15/46
455/406
2015/0229715 A1 * 8/2015 Sankar ................ G06F 9/5061
709/203
2017/0366624 A1 * 12/2017 Tsang .................. G06F 16/278
2018/0314750 A1 * 11/2018 Merriman ........... H04L 67/1097
2018/0349419 A1 * 12/2018 Annamalai ........... G06F 16/214
(Continued)

OTHER PUBLICATIONS

"App AutoScaler User Guide", Downloaded Apr. 14, 22, 10 pages, <https://github.com/cloudfoundry/app-autoscaler/blob/main/docs/Readme.md>.

(Continued)

*Primary Examiner* — Pierre Vital
*Assistant Examiner* — Jordan Scott Motter
(74) *Attorney, Agent, or Firm* — Seed Intellectual Property Law Group LLP

(57) ABSTRACT

Concepts for controlling interaction with scalable applications are presented. One example comprises associating metadata with an application interface specification of an application. Based on the metadata associated with the application interface specification of the application, configuration of shards for managing traffic of the interaction and/or integration with the application interface is controlled. Traffic is then routed to configured shards.

20 Claims, 5 Drawing Sheets

(56) References Cited

U.S. PATENT DOCUMENTS

| | | | | |
|---|---|---|---|---|
| 2019/0171537 | A1 | 6/2019 | Wang | |
| 2019/0361988 | A1 * | 11/2019 | Petters | G06F 16/1827 |
| 2020/0052979 | A1 * | 2/2020 | Clemm | H04L 67/51 |
| 2021/0034641 | A1 * | 2/2021 | Shraer | H04L 67/1023 |
| 2022/0129419 | A1 * | 4/2022 | Jo | G06F 16/183 |

OTHER PUBLICATIONS

"Community/custom-metrics-api.md at master", Downloaded Apr. 14, 22, 1 page, <https://github.com/kubernetes/community/blob/master/contributors/design-proposals/instrumentation/custom-metrics-api.md>.

"How do I achieve path-based routing on anApplication Load Balancer?", Last updated: Jan. 8, 2021, 3 pages, <https://aws.amazon.com/premiumsupport/knowledge-center/elb-achieve-path-based-routing-alb/>.

* cited by examiner

CONTROLLING INTERACTION WITH SCALABLE APPLICATIONS USING METADATA-DRIVEN SHARED CONFIGURATION

BACKGROUND

The technical character of the present invention relates generally to scalable applications, and more particularly to controlling interaction with scalable applications.

The present invention also relates to a computer program product comprising computer-readable program code that enables a processor of a system, or a number of processors of a network, to implement such a method.

The present invention further relates to a computer system comprising at least one processor and such a computer program product, wherein the at least one processor is adapted to execute the computer-readable program code of said computer program product.

The present invention also relates to a system for controlling interaction with scalable applications.

Many traditional computer application platforms enable microservice architectures where an application, or a component of an application, can be deployed and scaled independently of the rest of the system. These application platforms may be cloud-based (i.e. available to users on demand via the Internet from a cloud computing provider's servers), and may further enable the use of more than one cloud platform that each delivers a specific application service (i.e. a multi-cloud application platform). Microservices thus enable an application to be structured as a collection of loosely-coupled services. In traditional microservice architectures, an application is decomposed into different smaller services (services, microservices or smaller applications), which improves the architecture modularity.

For applications of a platform as described above, a workload balancer is typically implemented in front of the instances (i.e. replicas) of the microservices/services. The workload balancer distributes traffic across replicas, typically supported by an autoscaler that scales-out or scales-in the amount of replicas.

SUMMARY

The present invention seeks to provide a computer-implemented method for controlling interaction with scalable applications. Such methods may be computer-implemented. That is, such methods may be implemented in a computer infrastructure having computer executable code tangibly embodied on a computer readable storage medium having programming instructions configured to perform a proposed method.

The present invention further seeks to provide a computer program product including computer program code for implementing a proposed method when executed by a processing unit. The present invention also seeks to provide a processing system adapted to execute this computer program code.

The present invention also seeks to provide a system for controlling interaction with scalable applications.

According to an aspect of the present invention, there is provided a computer-implemented method. The method comprises associating metadata with an application interface specification of an application, the application interface specification comprising instructions relating to an interaction and/or integration with an application interface associated with the application. Based on the metadata associated with the application interface specification of the application, the method controls configuration of shards for managing traffic of the interaction and/or integration with the application interface. The method further comprises routing traffic to configured shards. Such routing may, for example, be based on how the shards have been configured and thus decided based on observations and/or the metadata associated with the application interface specification of the application.

Embodiments may be employed in combination with conventional/existing microservice systems. In this way, embodiments may integrate into legacy systems so as to improve and/or extend their functionality and capabilities. An improved microservice architecture may therefore be provided by proposed embodiments.

According to yet another aspect of the invention, there is provided a system for controlling interaction with scalable applications. The system comprises a metadata component configured to associate metadata with an application interface specification of an application, the application interface specification comprising instructions relating to an interaction and/or integration with an application interface associated with the application. The system also comprises a shard component configured, based on the metadata associated with the application interface specification of the application, to control configuration of shards for managing traffic of the interaction and/or integration with the application interface. The system yet further comprises a routing component configured to route traffic to configured shards.

According to another aspect of the invention, there is provided a computer program product for controlling interaction with scalable applications. The computer program product comprises a computer readable storage medium having program instructions embodied therewith, the program instructions executable by a processing unit to cause the processing unit to perform a method according to a proposed embodiment.

According to another aspect of the invention, there is provided a processing system comprising at least one processor and the computer program product according to an embodiment. The at least one processor is adapted to execute the computer program code of said computer program product.

Thus, there may be proposed concepts for load balancing that enable a system to meet fine-grained service level objectives. By way of example, proposed embodiments may provide metadata, such as annotations on an OpenAPI document or Kubernetes configuration document, to indicate that load balancing and auto-scaling for a given application should be treated differently, to meet distinct service level objectives, and such service-objectives may be defined for specific interaction and/or integration with the application interface. That is, embodiments may facilitate the definition and use of service level objectives for Application Programming Interface (API) approaches (e.g. REST, GraphQL, gRPC, etc.), paths, methods (e.g. POST, GET, PUT, DELETE, etc.), payload shapes, content, sizes, or combinations thereof. Such various fine-grained aspects of the application interface may be summarized as 'API facets'. Proposed embodiments may thus take into consideration traffic isolation and dedicated replica provisioning to meet fine-grained API facet level service level objectives.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
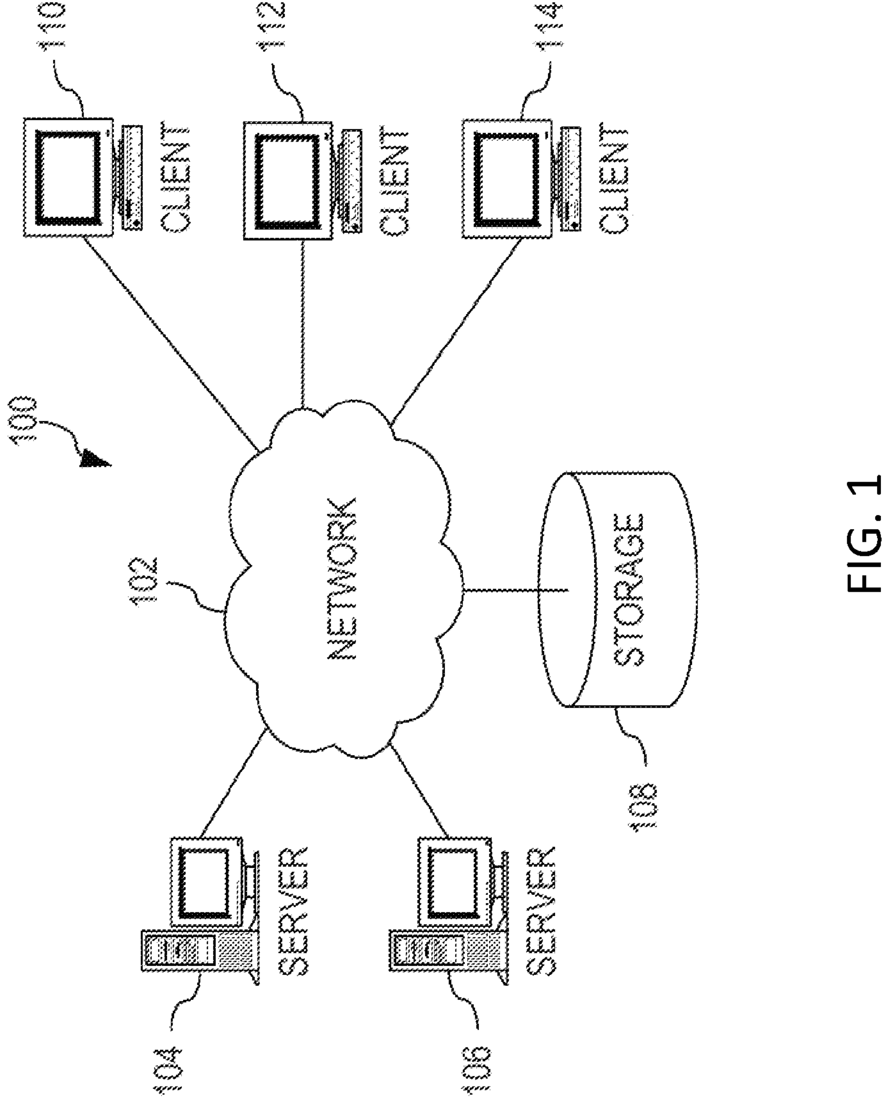
FIG. 1 depicts a pictorial representation of an example distributed system in which aspects of the illustrative embodiments may be implemented.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method may be a process for execution by a computer, i.e. may be a computer-implementable method. The various steps of the method may therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

The technical character of the present invention generally relates to scalable cloud environments, and more particularly, to meeting fine-grained service level objectives and/or agreements in a scalable cloud environment.

Load balancing and auto-scaling therefore occurs at the coarse-grained microservice-level and does not take into consideration traffic isolation and dedicated replica provisioning to meet fine-grained service level objectives.

Concepts for controlling interaction with scalable applications are proposed. Scalability in the context of cloud computing may be regarded as the ability to handle growing or diminishing resources to meet traffic demands in a capable way. In essence, scalability may provide a level of capacity that can grow or shrink as required.

Such concepts may involve a concept of associating metadata with an application interface specification of an application. Based on the metadata associated with the application interface specification of the application, the configuration of shards (for managing traffic of the interaction and/or integration with the application interface) may then be controlled. Traffic may then be routed to the configured shards. The routing may be undertaken according to how the shards are configured and thus based on observations about shard configuration and the metadata associated with the application interface specification of the application.

The metadata may be annotations on the interface specification (e.g. OpenAPI document or Kurbernetes configuration document) to indicate that load balancing, and autoscaling for a given application should be treated differently, to meet distinct objectives. Such annotations may be created manually by a user or generated automatically using a machine-learning algorithm.

For example, a developer or engineer may create the interface specification, including the metadata annotations. The metadata may, for example, include the service level objective, service level indicators, grace periods, cool down periods, and conditions when the service level objective is valid, such as time window, day, date, etc. On deployment, these annotations are registered with the platform technology (i.e. a multi-cloud application platform) that owns and hosts routing, load balancing and auto-scaling.

Embodiments may be applicable to Application Programming Interface (API) approaches (e.g. REST, GraphQL, gRPC, etc.), paths, methods (POST, GET, PUT, DELETE, etc.), payload shapes, content, sizes, or combinations thereof (hereinafter referred to as 'API facets'). For example, embodiments may enable the defining of a service level agreement (SLA) or service level objective (SLO) for a particular payload size. In yet another example, embodiment may facilitate the definition of an SLA or SLO for messages sent to the API containing particular content within the message structure.

The platform technology inspects annotations for objectives defined for API facets. If a service level objective is defined for an API facet, a logical or physical auto-scaling group shard is created with an attached logical or physical load balancer shard, dedicated to serve the API facet, when the application is deployed, when the service level threshold is valid and breached, or when the service level objective is valid and breached.

When conditions are met for the service level objective, the auto-scaling group shard repurposes general purpose replicas to become dedicated replicas or launch new dedicated replicas. When dedicated replicas are ready, the attached load balancer shard distributes this traffic across these dedicated replicas.

The auto-scaling group shard can continuously monitor aggregated service level indicators from the attached load balancer shard and dedicated replicas. The auto-scaling group shard may then make a decision to scale-out the amount of replicas if the aggregated service level indicators do not meet the defined service level objective for the API facet.

If a service level objective (indicated by annotation metadata) has been sufficiently met, the auto-scaling group shard may remove replicas from the auto-scaling group shard and mark them as available to other shards for a period of time. Other auto-scaling group shards may claim available replicas to fulfil other service level objectives.

Such a proposed approach may reduce start up time, as the available replicas have the code necessary to help meet service level objectives defined for other API facets. However, if these replicas are not claimed within the period of time, they may be terminated for cost optimisation.

Also, if a service level objective has been sufficiently met, the auto-scaling group shard and attached load balancer shard may be decommissioned for cost optimisation.

Embodiments may be implemented in conjunction with an interface specification. The interface specification may also be referred to as an interface document, API document, UI (user interface) specification, or Swagger document, and may comprise a specification or description for the application adhering to a standardized framework. The interface specification may capture the details of the software user interface into a written document and cover all possible actions that an end user may perform via the application, as well as all visual, auditory and other interaction elements in the application. The interface specification may thus be the main source of implementation/integration information for how the application should work. Beyond implementation, the interface specification may consider usability, localization, and demo limits. In general, the goal of a requirement specification may be to describe what a product (i.e. an application) is capable of, whereas the interface specification may detail how these requirements are implemented in practice. For example, a Swagger document (or a Swagger specification) is a specification for machine-readable interface files for describing, producing, consuming, and visualizing RESTful (representational state transfer) web services (i.e. applications), and documenting RESTful API. Representational state transfer is a software architectural style that defines a set of constraints to be used for creating web services. Web services that conform to the REST architectural style (i.e. RESTful web services) provide interoperability between computer systems on the Internet. A RESTful API is an application programming interface that uses HTTP requests to enable two or more applications to communicate with each other.

Proposed embodiments may employ a concept of providing metadata, such as annotations to an interface specification, to indicate that load balancing or auto-scaling for a given application should be treated differently, so as to meet distinct service level objectives/agreements.

Accordingly, the inventors propose using the metadata to control the configuration of shards for managing traffic of an interaction and/or integration with an application interface. Traffic to a configured shard may then be routed based on the metadata associated with the interface specification for an application.

Embodiments may thus facilitate management or routing and coordination of traffic to shards. Also, embodiments may improve user experience and facilitate the ability to define service level objectives for a given API facet, without the user having to break out the application, modify application code and manage multiple deployments.

In some embodiments, the metadata may describe at least one of a service agreement and a service objective for an interaction with the application interface of the application. For example, the metadata may include a service level objective, service level indicator, grace period, cool down period, and/or conditions when the service level objective is valid, such as time window, day, date, etc. On deployment, these annotations may be registered with the platform technology that owns and hosts routing, load balancing and auto-scaling. Embodiments may thus enables multiple competing API facet level service level objectives to be defined and met for a given application.

The metadata may be created manually by a user or it may be generated automatically using machine learning algorithms. As a result, the information relating to the interaction and/or integration for an application may be specifically tailored (e.g. by a user) for a predefined purpose. This may enable improved control and coordination in managing the interaction with the application.

In some embodiments, the metadata may be registered with a platform configured to create logical or physical load balancing shards and auto-scaling group shards.

In some embodiments, the application may be located in a scalable cloud environment. In this way, the instructions provided by the metadata may be generated based on a planned level of capacity for the application that can grow or shrink as needed. As a result, the risk of the application crashing (or even slowing down) due to increased traffic may be mitigated. In this way, costs may be reduced or optimized through a reduction in a total number of replicas for a given application.

Embodiments may also help to reduce a replica start up time by repurposing replicas dynamically to meet multiple service level objectives, prior to replica termination FIG. 1 depicts a pictorial representation of an exemplary distributed system in which aspects of the illustrative embodiments may be implemented. Distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, a first 104 and second 106 servers are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

Figure 2:
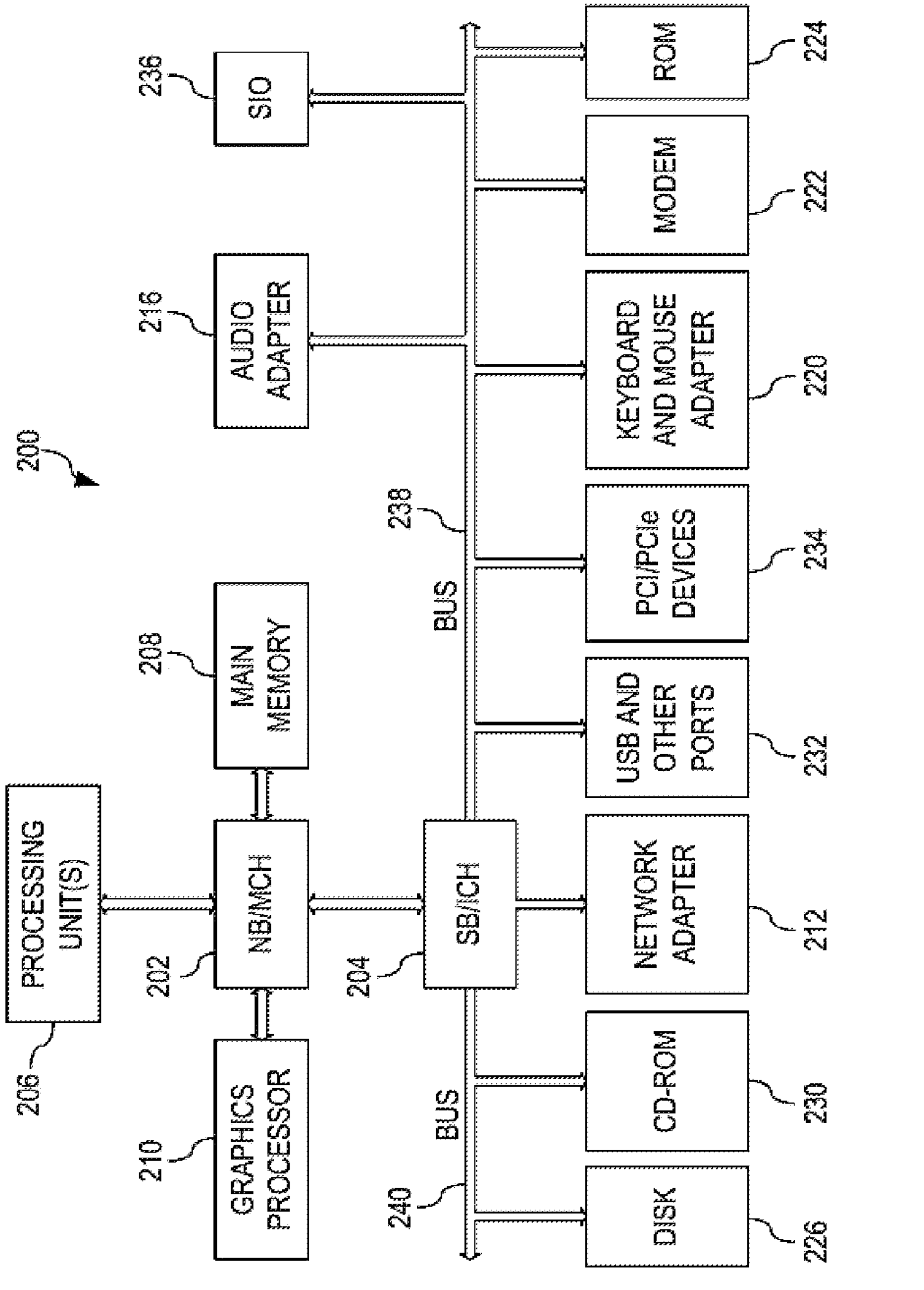
FIG. 2 is a block diagram of an example system in which aspects of the illustrative embodiments may be implemented.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present invention may be located. For instance, the system 200 may be configured to implement a metadata component, a shard component, and a routing component according to an embodiment.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200.

As a server, system 200 may be, for example, an IBM® eServer™ System p® computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed.

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

Figure 3:
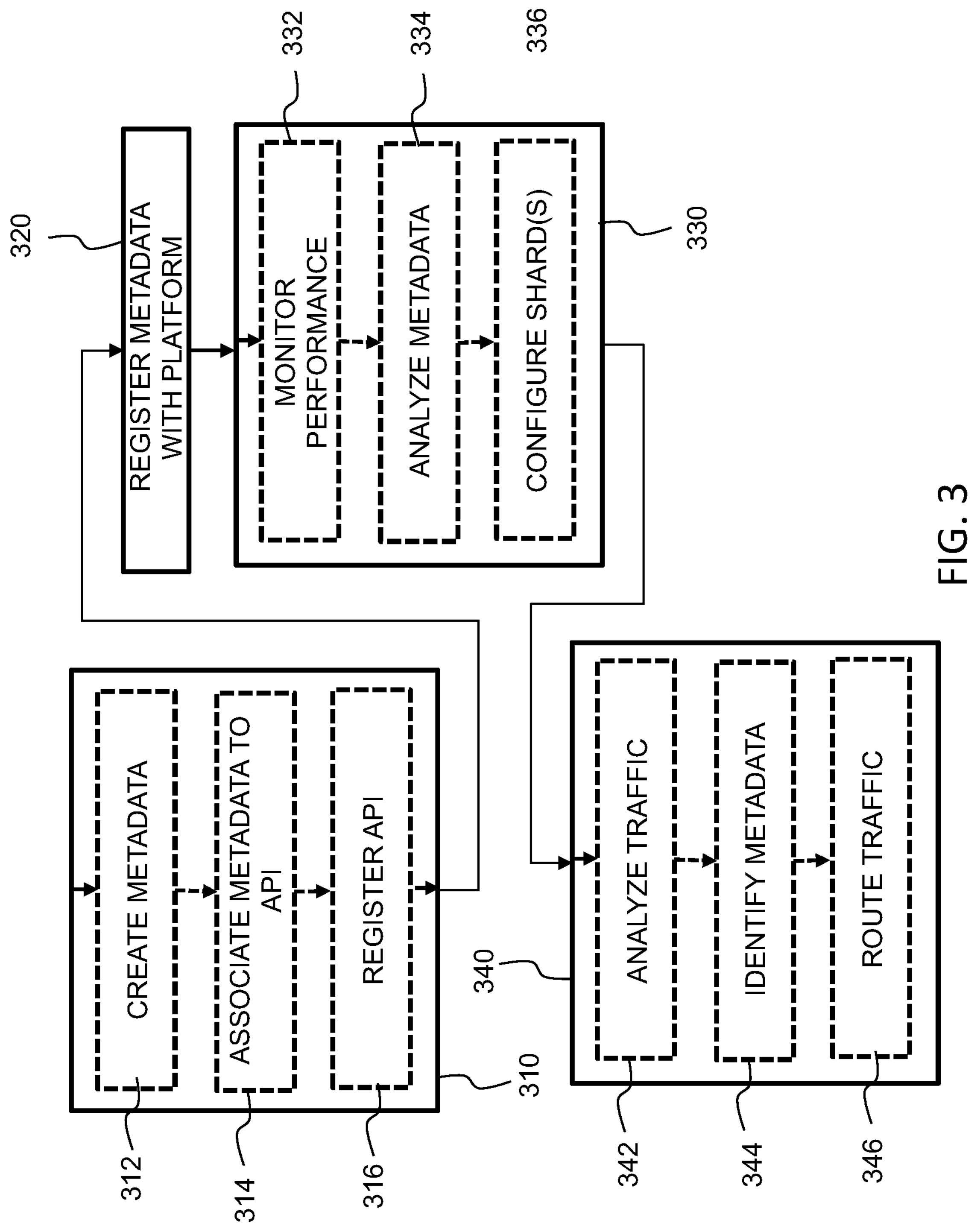
FIG. 3 is a flow diagram of a computer-implemented method for controlling interaction with scalable applications.

Referring now to FIG. 3, there is depicted a flow diagram of a proposed computer-implemented method for controlling interaction with scalable applications.

Step 310 comprises associating metadata with an application interface specification of an application. For example, the application is located in a scalable cloud environment and has an associated Swagger document (i.e. an interface specification) in a predefined location. In this exemplary method, the application is deployed to an open source, multi-cloud application platform that provides routing and scaling capabilities (which are already widely known and available). Also, the interface specification for the application comprises instructions relating to an interaction and/or integration with an application interface associated with the application. Specifically, the interface specification comprises a Swagger document and/or an API document.

Here, metadata describes at least one of a service agreement and a service objective for an interaction with the application interface of the application.

By way of example, associating metadata with the application interface specification of the application comprises steps 312, 314, and 316. Step 312 comprises creating the metadata. Step 314 comprises associating the created metadata with the application interface specification. Step 316 comprises registering the application interface specification to the application.

Step 320 comprises registering the metadata with a platform configured to create logical or physical load balancing shards and auto-scaling group shards.

Step 330 comprises controlling configuration of shards for managing traffic of the interaction and/or integration with the application interface, based on the metadata associated with the application interface specification of the application.

More specifically, in this exemplary embodiment, controlling configuration of shards for managing traffic of the interaction and/or integration with the application interface comprises steps 332, 334, and 336. Step 332 comprises monitoring a performance indicator of at least one of: the application interface and the application. Step 334 comprises analyzing the performance indicator and the metadata associated with the application interface specification of the application. Step 336 comprises, based on the analysis result, creating, repurposing, initiating, decommissioning or launching a shard for managing traffic of an interaction and/or integration with the application interface.

Step 340 comprises routing traffic to configured shards, based on the metadata associated with the application interface specification of the application. Here, the traffic comprises a command to be performed by an instance of the application.

In this embodiment, routing traffic to configured shards, comprises steps 342, 344, and 346. Step 342 comprises analyzing the traffic to identify a target interaction and/or target integration with a target application interface. Step 344 comprises identifying metadata associated with the target application interface specification of the application. Step 346 comprises routing the traffic to one or more configured shards for managing traffic of the target interaction and/or target integration with the application interface, based on the identified metadata associated with the target application interface specification of the application.

Figure 4:
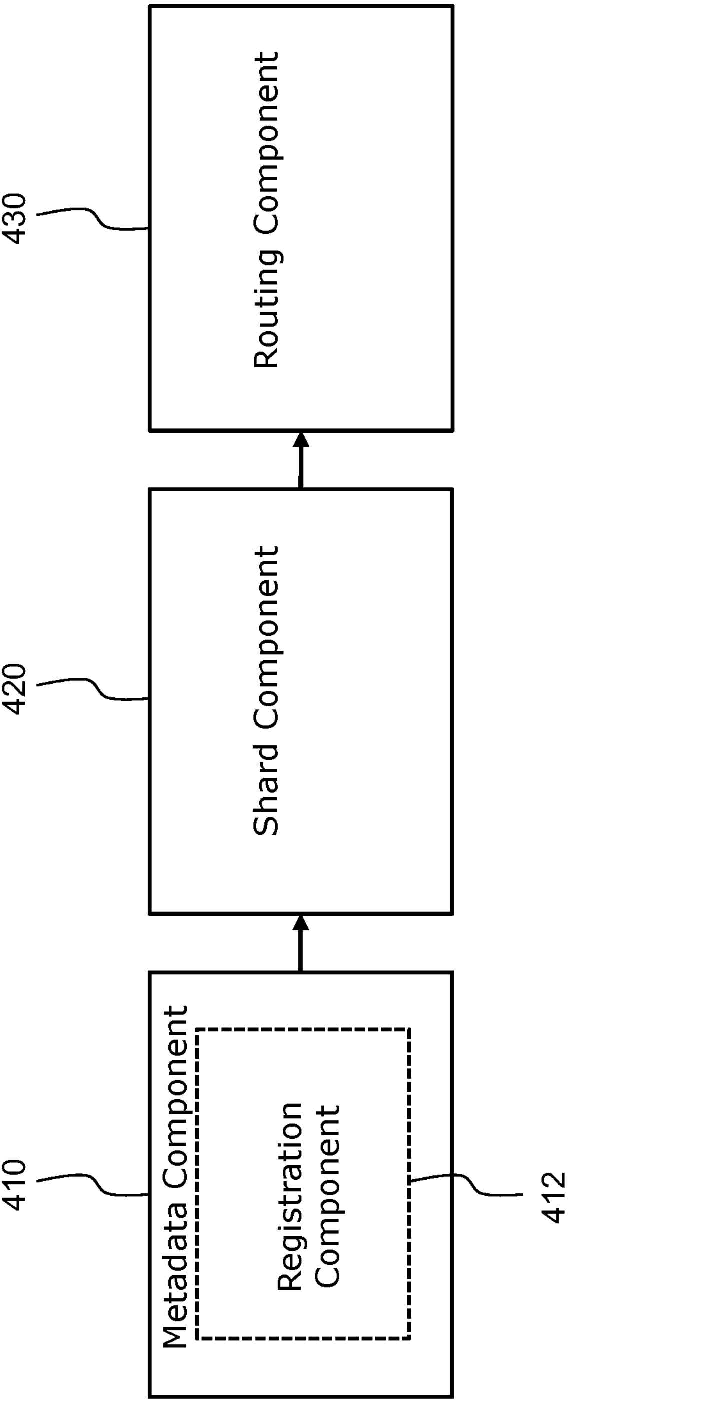
FIG. 4 is a simplified block diagram of an exemplary embodiment of a system for controlling interaction with scalable applications.

Referring now to FIG. 4, there is depicted a simplified block diagram of an exemplary embodiment of a system for controlling interaction with scalable applications.

The system comprises a metadata component 410 configured to associate metadata with an application interface specification of an application, wherein the application interface specification comprises instructions relating to an interaction and/or integration with an application interface associated with the application. The metadata describes at least one of a service agreement and a service objective for an interaction with the application interface of the application. The metadata component also comprises a registration component 412 configured to register the metadata with a shard component configured to create logical or physical load balancing shards and auto-scaling group shards.

The system also comprises a shard component 420 configured, based on the metadata associated with the application interface specification of the application, to control configuration of shards for managing traffic of the interaction and/or integration with the application interface.

The system further comprises a routing component 430 configured to route traffic to configured shards, based on the metadata associated with the application interface specification of the application.

In an embodiment, the metadata component 410 is configured to: create metadata; associate the created metadata with the application interface specification; and register the application interface specification to the application.

In an embodiment, the shard component 420 is configured to: monitor a performance indicator of at least one of: the application interface and the application; analyze the performance indicator and the metadata associated with the application interface specification of the application; and based on the analysis result, create, repurpose, initiate, decommission or launch a shard for managing traffic of an interaction and/or integration with the application interface.

In an embodiment, the routing component 430 is configured to: analyze the traffic to identify a target interaction and/or target integration with a target application interface; identify metadata associated with the target application interface specification of the application; and route the traffic to one or more configured shards for managing traffic of the target interaction and/or target integration with the application interface, based on the identified metadata associated with the target application interface specification of the application.

By way of further description of the proposed concept(s), a theoretical example will now be described. The example will be described in relation to a booking application with the following API methods and paths:

GET, POST, PUT and DELETE/bookings

GET/metrics

Other API methods and paths

For the example, the following service level objectives are desired:

GET/bookings to achieve a response time of 20 milliseconds

POST/bookings to achieve a throughput of 200 requests handled per second

PUT/bookings to achieve a throughput of 150 requests handled per second.

Using conventional approaches, it would be necessary to define these service level objectives at the application-level, and therefore it would not be possible to define response time at the API facet level, with all traffic being subject to achieve a response time of 20 milliseconds. Also, it would not be possible to define throughput at the API facet level, and thus an aggregated throughput would need to be defined at the application-level to cater for POST and PUT/bookings throughput PLUS an allowance for other API paths and methods (e.g. 200+150+an allowance of say 50=400). The aforementioned drawbacks involve upfront estimation and planning, and limit flexibility, contrary to cloud benefits.

Further, because a scope of the service level objectives has increased due to having to define them at the application-level, it would also likely require a larger quantity of replicas at peak load. For example:

GET, PUT and DELETE/bookings to ALL achieve a response time of 20 milliseconds=~3 replicas POST/bookings to achieve a throughput of 200 requests handled per second AND to achieve a response time of 20 milliseconds=~3 replicas PUT/bookings to achieve a throughput of 150 requests handled per second AND to achieve a response time of 20 milliseconds (plus the throughput allowance for other traffic)=~2 replicas Thus, meaning a requirement of ~8 replicas at peak load.

Yet further, it may not be viable to guarantee these service level objectives, as traffic would not be isolated to dedicated replicas. For example, consider a situation where GET/metrics requests spike to 400 requests per second, surpassing the upfront planned aggregated throughput objective of 400 requests per second. This traffic, as it starts to saturate replicas, would significantly impact throughput service level objectives for both POST and PUT/bookings. The system would neither be aware of the actual distinct throughput for POST and PUT/bookings nor be able to react to deficiencies (that is, the throughput service level objective at the application-level may be (incorrectly) deemed to be sufficiently met).

The following example, however, demonstrates how one possible implementation of proposed concept(s) can overcome the abovementioned issues.

(I) The bookings application is deployed to a platform like Cloud Foundry, and has an associated OpenAPI document in a predefined location—the document includes metadata to indicate a service level objective, and therefore should be treated differently as follows:

```
---
openapi: 3.0.0
info:
  title: Bookings
...
paths:
/bookings:
post:
summary: Creates a new booking
serviceLevel:
objective: 200 # requests
threshold: 175 # requests
measures:
indicator: throughput-per-second
comparison: hits-per-second
samplePeriod: 30 # in seconds
```

-continued

```
coolDownPeriod: 60 # in seconds
scaleOutGrace: 0 # in seconds
scaleInGrace: 120 # in seconds
conditions:
...
...
put:
summary: Updates an existing booking
serviceLevel:
objective: 150 # requests
...
...
get:
summary: Retrieve bookings
serviceLevel:
objective: 20 # in milliseconds
measures:
indicator: response-time-in-milliseconds
```

The above exemplary metadata indicates to the platform to guarantee a throughput of 200 requests handled per second for the POST method of the/bookings API, 150 requests handled per second for the PUT method of the/bookings API, and a response time of 20 milliseconds for the GET method of the/bookings API.

(II) The API document (i.e. application interface specification) is registered with the platform routing, load balancing and auto-scaling components.

(III) The platform creates an auto-scaling group with an attached load balancer at the application-level and associated replicas to serve generic traffic. It also inspects service level objective annotations (i.e. metadata) and identifies service level objectives defined on the POST, PUT and GET methods of the/bookings API path, and registers them.

(IV) When a service level objective is valid and the threshold is breached, the platform creates a logical auto-scaling group shard with an attached logical load balancer shard. The logical auto-scaling group shard creates dedicated replicas to serve traffic for the API facet (e.g. POST/bookings), which is now isolated to being served by this shard.

(V) When replicas are ready, platform routing routes POST/bookings traffic to the load balancing shard, which distributes this traffic across these dedicated replicas. Other traffic is routed to general purpose replicas created by the main auto-scaling group.

(VI) The auto-scaling group shard continuously monitors aggregated service level indicators from the attached load balancer shard and dedicated replicas.

(VII) For an average hits per second of 200 or less, the auto-scaling group shard ensures that the aggregated average throughput per second is able to meet the average hits per second. If the average hits per second is greater than the aggregated average throughput per second, it will claim available or create new replicas until the service level objective is achieved. For an average hits per second of a value greater than 200, the auto-scaling group shard will stop adding replicas when the aggregated average throughput per second is 200.

(VIII) The auto-scaling group shard will store historic data of the average throughput per second achieved by each replica. If the average hits per second falls below the aggregated average throughput per second and does not return for 120 seconds, one or more replicas may be removed depending on the new average hits per second, and the average throughput per second achieved by a given replica. For example, where both the average hits per second and the aggregated average throughput per second was once 200, with 4 replicas in the group, and each individual replica achieved an average throughput of 50 requests handled per second. Then the average hits per second began to fall and did not return over a period of 120 seconds, with a new average hits per second of 125. This means that one replica would be removed from the group. When a replica from the auto-scaling group shard is removed, it is marked as available to other auto-scaling group shards for a period of time.

(IX) Other auto-scaling group shards may claim available replicas to fulfil other service level objectives. This technique reduces start up time, as the available replicas have the code necessary to help meet service level objectives defined for other API facets. However, if these replicas are not claimed within the period of time, they will be terminated for cost optimisation.

(X) Further, if the service level objective has been sufficiently met, the auto-scaling group shard and attached load balancer shard may be decommissioned for cost optimisation.

Alternatively, or additionally, other implementations of the proposed concept(s) may choose to:

create a physical auto-scaling group shard with an attached physical load balancer shard.

create an auto-scaling group shard with an attached load balancer shard on deployment, or when the service level objective is valid and breached.

From the description provided of the preceding example, it will be understood that the proposed concept enables the definition of service level objectives at the API facet level. Also, the platform can be leveraged to guarantee the objectives are met with traffic isolation and resource dedication. Also, embodiment may alleviate a need for upfront estimation/planning with respect to aggregated throughput at the application level, with the general purpose auto-scaling group handling other traffic, controlling scaling via CPU and memory metrics.

The preceding example also demonstrated how it is not needed to have the requirement of a 20 millisecond response time associated with all traffic. This helps to reduce the amount of replicas required at peak load. For example:

GET/bookings to achieve a response time of 20 milliseconds=~1 replica

POST/bookings to achieve a throughput of 200 requests handled per second=~2 replicas PUT/bookings to achieve a throughput of 150 requests handled per second=~1 replica +Other general purpose traffic=~1 replica +Meaning 5 replicas at peak load, compared to 8 replicas with conventional approaches.

Although the above example is described in relation to the Cloud Foundry™ platform, it to be understood that the proposed concept(s) may be applicable to any platform providing routing, load balancing and auto-scaling capabilities (such as Kubernetes, Apache Mesos, Docker Compose, etc.).

From the preceding description of exemplary embodiments, it will be understood that there is proposed a system for commissioning, managing and decommissioning routing, load balancing shards and auto-scaling shards to meet distinct service level objectives that can be defined for different API approaches (REST, GraphQL, gRPC, etc.), paths, methods (POST, GET, PUT, DELETE, etc.), payload shapes, content, sizes, or combinations thereof. The system may be summarized as comprising the following components:

A registration component for registering an application API or configuration document with the routing, load balancing and auto-scaling components;

A load balancing shard and auto-scaling group shard factory component configured to create logical or physical load balancing shards and auto-scaling group shards to serve specific API facet traffic. This may be done based on metadata associated with the API document (or configuration document for the application when the application is deployed), e.g. when a service level threshold is valid and breached, or when a service level objective is valid and breached.

A routing component operable to route specific API facet traffic to dedicated shards based on metadata associated with the API document or configuration document for the application Load balancing and auto-scaling group shard components configured to meet service level objectives for a specific API interaction and/or integration by monitoring and claiming replicas (or launching dedicated replicas), based on metadata associated with the API document or configuration document for the application Load balancing and auto-scaling group shard components operable to release replicas to other shards to reduce replica start up time, or cost optimize once the service level objectives for a specific API facet has been met based on metadata associated with the API document or configuration document for the application. This includes nominating replicas to be released based on historic performance data of the service level objective being monitored. Such components may also decommission load balancing and auto-scaling group shards if the service level objective has been sufficiently met to further cost optimise.

Figure 5:
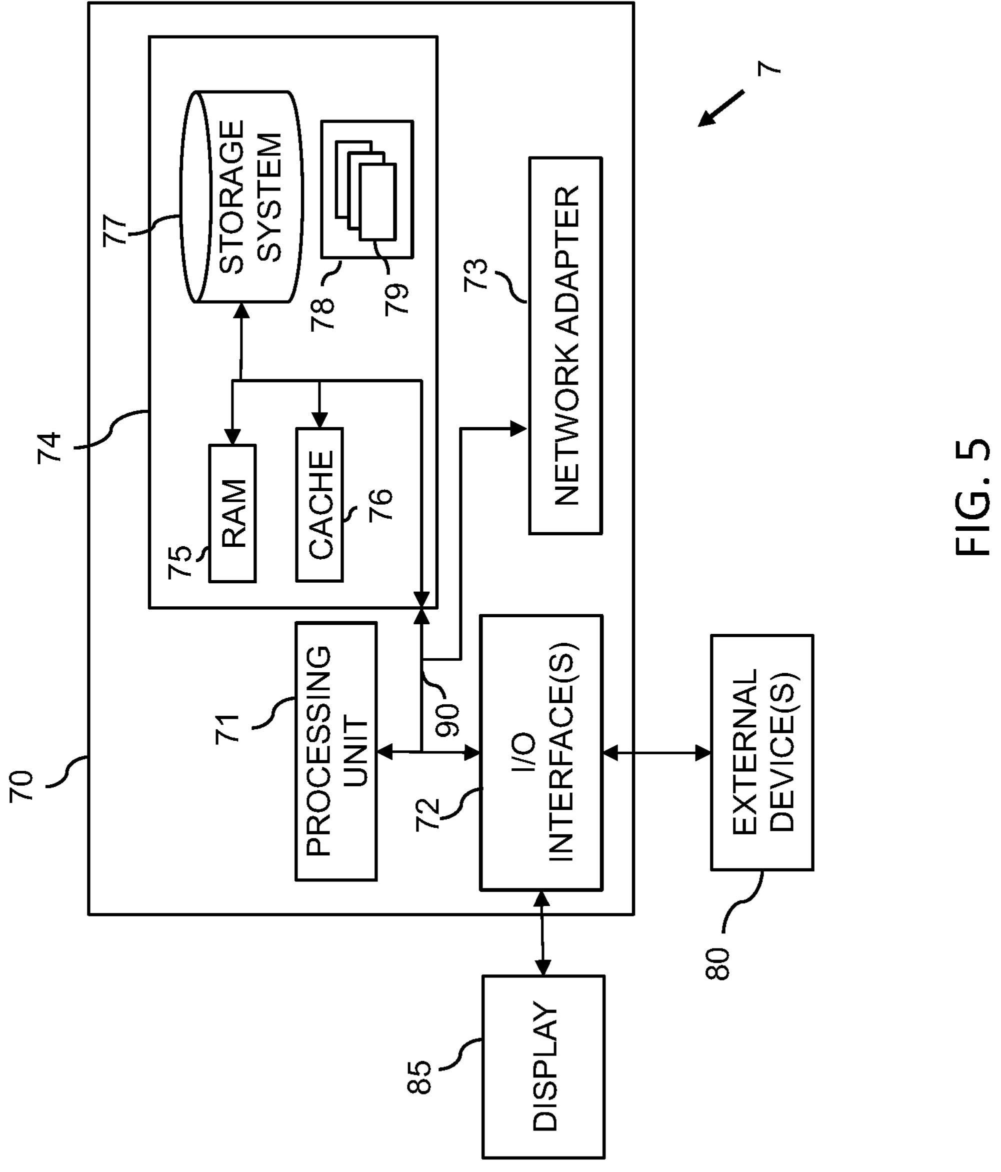
FIG. 5 is a simplified block diagram of an exemplary embodiment of a system for controlling interaction with a scalable application.

By way of further example, as illustrated in FIG. 5, embodiments may comprise a computer system 70, which may form part of a networked system 7. For instance, a routing unit may be implemented by the computer system 70. The components of computer system/server 70 may include, but are not limited to, one or more processing arrangements, for example comprising processors or processing units 71, a system memory 74, and a bus 90 that couples various system components including system memory 74 to processing unit 71.

System memory 74 can include computer system readable media in the form of volatile memory, such as random access memory (RAM) 75 and/or cache memory 76. Computer system/server 70 may further include other removable/non-removable, volatile/non-volatile computer system storage media. In such instances, each can be connected to bus 90 by one or more data media interfaces. The memory 74 may include at least one program product having a set (e.g., at least one) of program modules that are configured to carry out the functions of proposed embodiments. For instance, the memory 74 may include a computer program product having program executable by the processing unit 71 to cause the system to perform, a method for controlling interaction with a scalable application according to a proposed embodiment.

Program/utility 78, having a set (at least one) of program modules 79, may be stored in memory 74. Program modules 79 generally carry out the functions and/or methodologies of proposed embodiments for controlling interaction with a scalable application.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73 (e.g. to communicate recreated content to a system or user).

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for controlling interaction with scalable applications, the computer-implemented method comprising:

associating metadata with an application interface specification of an application, wherein the application interface specification comprises instructions relating to an interaction with an application interface associated with the application;

creating an auto-scaling group shard with an attached load balancer at an application-level;

determining whether a service level objective (SLO) is valid and exceeds a service level threshold;

generating replicas associated with the auto-scaling group shard to serve traffic when the SLO is valid and exceeds the service level threshold;

based on the metadata associated with the application interface specification of the application, controlling a configuration of the auto-scaling group shard for managing the traffic of the interaction with the application interface by monitoring and claiming the replicas; and routing the traffic to the configured auto-scaling group shard.

2. The computer-implemented method of claim 1, further comprising:

registering the metadata with a platform configured to create logical or physical load balancing shards and auto-scaling group shards.

3. The computer-implemented method of claim 1, wherein the metadata describes at least one of a service agreement and a service objective for the interaction with the application interface of the application.

4. The computer-implemented method of claim 1, wherein the associating metadata with the application interface specification of the application comprises:

creating the metadata;

associating the created metadata with the application interface specification; and registering the application interface specification to the application.

5. The computer-implemented method of claim 1, wherein the routing the traffic to the configured auto-scaling group shard comprises:

analyzing the traffic to identify a target interaction with a target application interface;

identifying the metadata associated with a target application interface specification of the application; and routing the traffic to the configured auto-scaling group shard for managing the traffic of the target interaction with the application interface, based on the identified metadata associated with the target application interface specification of the application.

6. The computer-implemented method of claim 1, wherein the controlling the configuration of the auto-scaling group shard comprises:

monitoring a performance indicator of at least one of: the application interface and the application;

analyzing the performance indicator and the metadata associated with the application interface specification of the application; and based on a result of the analysis, creating, repurposing, initiating, decommissioning or launching a shard for managing the traffic of the interaction with the application interface.

7. The computer-implemented method of claim 1, wherein the traffic comprises a command to be performed by an instance of the application.

8. The computer-implemented method of claim 1, wherein the application is located in a scalable cloud environment.

9. A computer program product for pre controlling interaction with scalable applications, the computer program product comprising:

one or more computer readable storage media; and program instructions stored on the one or more computer readable storage media, the program instructions comprising:

associating metadata with an application interface specification of an application, wherein the application interface specification comprises instructions relating to an interaction with an application interface associated with the application;

creating an auto-scaling group shard with an attached load balancer at an application-level;

determining whether a service level objective (SLO) is valid and exceeds a service level threshold;

generating replicas associated with the auto-scaling group shard to serve traffic when the SLO is valid and exceeds the service level threshold;

based on the metadata associated with the application interface specification of the application, controlling a configuration of the auto-scaling group shard for managing the traffic of the interaction with the application interface by monitoring and claiming the replicas; and routing the traffic to the configured auto-scaling group shard.

10. The computer program product of claim 9, the program instructions, stored on the one or more computer readable storage media, further comprising:

registering the metadata with a platform configured to create logical or physical load balancing shards and auto-scaling group shards.

11. The computer program product of claim 9, wherein the metadata describes at least one of a service agreement and a service objective for the interaction with the application interface of the application.

12. The computer program product of claim 9, wherein the program instructions to associate the metadata with the application interface specification to the application comprises:

creating the metadata;

associating the created metadata with the application interface specification; and registering the application interface specification to the application.

13. The computer program product of claim 9, wherein the program instructions to route the traffic to the configured auto-scaling group shard comprises:

analyzing the traffic to identify a target interaction with a target application interface;

identifying the metadata associated with a target application interface specification of the application; and routing the traffic to the configured auto-scaling group shard for managing the traffic of the target interaction with the application interface, based on the identified metadata associated with the target application interface specification of the application.

14. The computer program product of claim 9, wherein program instructions to control the configuration of the auto-scaling group shard comprises:

monitoring a performance indicator of at least one of: the application interface and the application;

analyzing the performance indicator and the metadata associated with the application interface specification of the application; and based on a result of the analysis, creating, repurpose, initiate, decommission or launch a shard for managing the traffic of the interaction with the application interface.

15. The computer program product of claim 9, wherein the traffic comprises a command to be performed by an instance of the application.

16. The computer program product of claim 9, wherein the application is located in a scalable cloud environment.

17. A computer system for pre controlling interaction with scalable applications, comprising:

one or more computer processors;

one or more computer readable storage media; and program instructions stored on the one or more computer readable storage media for execution by at least one of the one or more computer processors, the program instructions comprising:

associating metadata with an application interface specification of an application, wherein the application interface specification comprises instructions relating to an interaction with an application interface associated with the application;

creating an auto-scaling group shard with an attached load balancer at an application-level;

determining whether a service level objective (SLO) is valid and exceeds a service level threshold;

generating replicas associated with the auto-scaling group shard to serve traffic when the SLO is valid and exceeds the service level threshold;

based on the metadata associated with the application interface specification of the application, controlling a configuration of auto-scaling group shard for managing the traffic of the interaction with the application interface by monitoring and claiming the replicas; and routing the traffic to the configured auto-scaling group shard.

18. The computer system of claim 17, wherein the program instructions, stored on the one or more computer readable storage media, further comprise:

registering the metadata with a platform configured to create logical or physical load balancing shards and auto-scaling group shards.

19. The computer-implemented method of claim 1, further comprising:

determining that aggregated service level indicators do not meet a defined service level objective for an Application Programming Interface (API) facet; and scaling out, by the auto-scaling group shard based on the determination, the replicas.

20. The computer-implemented method of claim 1, further comprising:

determining that the service level objective has been sufficiently met, indicated by annotation metadata;

removing, by the auto-scaling group shard based on the determining, replicas from the auto-scaling group shard and marking the removed replicas as available to other shards for a period of time; and claiming, by one or more other auto-scaling group shards, available replicas to fulfil other service level objectives.

* * * * *